A. E. COWAN.
CULINARY DEVICE.
APPLICATION FILED MAR. 27, 1916.
1,312,616.
Patented Aug. 12, 1919.
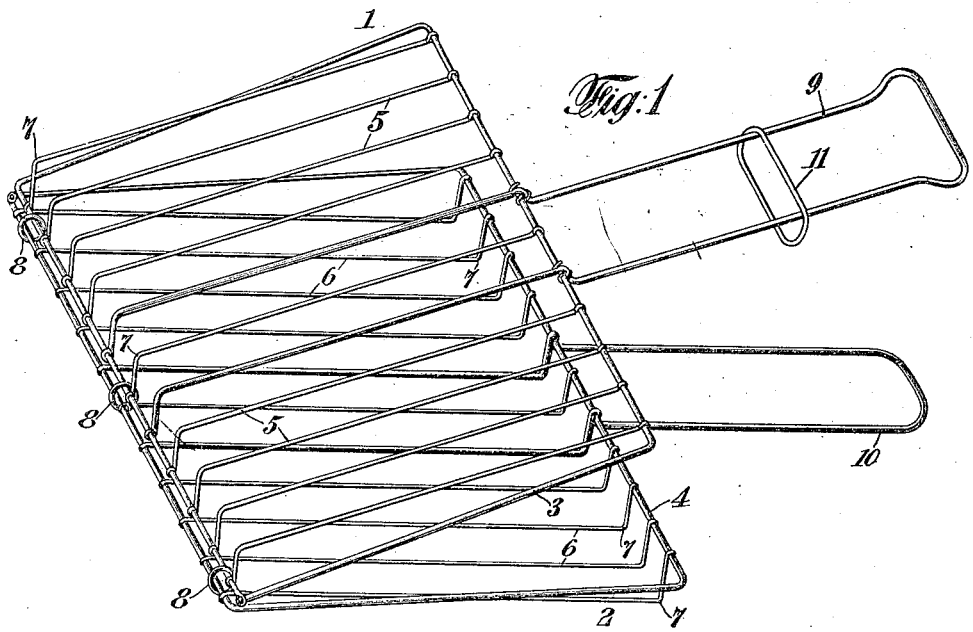
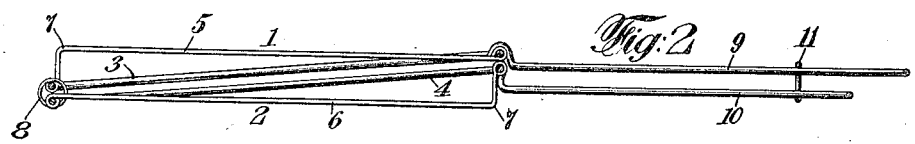
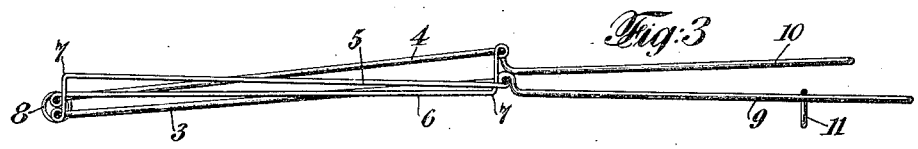
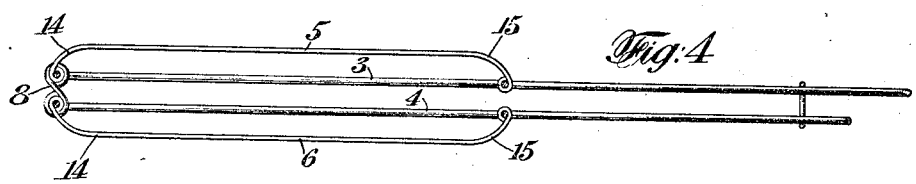
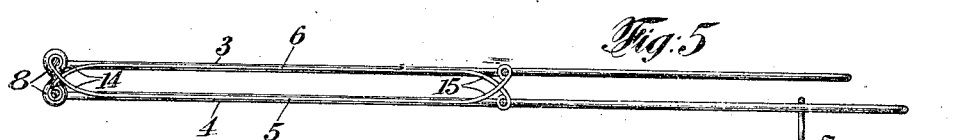
Inventor
Arthur E. Cowan
By his Attorneys
Kenyon & Kenyon

UNITED STATES PATENT OFFICE.

ARTHUR E. COWAN, OF GLOUCESTER, MASSACHUSETTS, ASSIGNOR OF ONE-FOURTH TO GORHAM CROSBY, OF GLEN RIDGE, NEW JERSEY.

CULINARY DEVICE.

1,312,616.   Specification of Letters Patent.   Patented Aug. 12, 1919.

Application filed March 27, 1916. Serial No. 86,905.

*To all whom it may concern:*

Be it known that I, ARTHUR E. COWAN, a citizen of the United States, and a resident of Gloucester, county of Essex, State of Massachusetts, have invented certain new and useful Improvements in Culinary Devices, of which the following is a specification.

My invention relates to improvements in culinary devices and more particularly to that class including broilers, grills, toasters, and the like.

In the broiling, warming or cooking of various foods on such devices, it often happens that the food material will stick to that part of the device on which it lies and cannot be easily dislodged therefrom without breaking or otherwise disfiguring it, as in the case of chopped meat. Likewise the material may stick to the top of the device.

The main object of the invention is to provide an arrangement, by means of which the material, after being cooked in such culinary device, may be easily dislodged therefrom. Further objects, features and advantages will more clearly appear from the detailed description given below, taken in connection with the accompanying sheet of drawings, which forms a part of this specificaton.

In the drawings Figure 1 is a perspective of a device embodying my improvements in one form. Fig. 2 is a transverse section thereof with the parts in closed position. Fig. 3 is a similar section with the parts reversed, in a manner to dislodge the material which may have stuck to the bottom of the device. Fig. 4 is a view similar to that of Fig. 2, illustrating a modification. Fig. 5 is a view similar to Fig. 3, but illustrating the modification of Fig. 4.

Referring to Figs. 1, 2 and 3, the device there shown consists of a top member 1 and a bottom member 2, each composed of heavy wire rectangular frame parts 3 and 4 respectively, each frame member having its two opposite sides connected by means of parallel rods 5 and 6, respectively. Each of the rods 5 and 6 is bent at 7, so that when the top and bottom members are placed together as shown in Fig. 2, the rods 5 are spaced above the rods 6, although they extend substantially parallel to one another, so as to form a substantially flat rectangular inclosure for the material to be cooked or heated.

The top and bottom members are hinged together by means of rings or links 8. Two of the rods 5 are continued beyond the frame 3 and form a suitable handle 9, while two of the rods 6 are continued beyond the frame 4 to form a handle 10 for the lower member, a suitable link 11 being provided for locking the handles together when desired, in a well-known manner, Assuming that the material to be cooked lies upon the rods or wires 6, then when it is desired to dislodge the same it is only necessary to reverse the parts by swinging the top 1 about the hinges 8 to bring it in the position shown in Fig. 3. As the top 1 is swung about to this position, the parts or wires 5 thereof pass up between the parts or wires 6 of the bottom member, the wires or rods of one member being substantially parallel to those of the other member, so that the material is dislodged from the wires 6, and is easily removed from the device. Indeed the material will then lie upon the rods 5 instead of the rods 6, and may be made to slide off of the rods 5 at the left hand end of the device, as is shown in Fig. 3, as at that end there is no upright portion to prevent the material from sliding off of the rods 5.

The arrangement shown in Figs. 4 and 5 is substantially the same, except that the rods 5 and 6 are bent at both ends at 14 and 15, instead of only at one end, as shown in Figs. 1, 2 and 3, at 7.

It will be understood that either of the members 1 or 2 may be used as the top member and either as the bottom member.

It will be clear that many other modifications and changes may be made without departing from the spirit and scope of the invention in its broader aspects. Consequently I do not desire to be limited to the details shown and described, but I intend to cover all devices of the class in question which come within the language of the appended claims. What I claim as new and desire to secure by Letters Patent is:

1. A device of the class described, having two connected members, one member having parts adapted to pass between parts of the other member sufficiently to dislodge material thereon upon reversal of the parts.

2. A culinary device of the class described, including two coöperating members, hinged with respect to one another, one member having means for dislodging material on the other member upon reversal of the parts.

3. A device of the class described, having top and bottom members hinged together, the top member having parts adapted to pass between parts of the other member sufficiently to dislodge material thereon upon reversal of parts.

4. A device of the class described, having two members hinged together, and provided with normally substantially parallel supporting rods, rods of one member being adapted to pass between rods on the other member upon reversal of the parts sufficiently to dislodge the material thereon.

5. A device of the class described comprising top and bottom members, each member having a frame piece and handle, and substantially parallel rods carried by the frame pieces, the rods on one member being adapted to pass between the rods on the other sufficiently to dislodge the material thereon.

6. A device of the class described, comprising top and bottom members hinged together, each member having a frame piece and handle, and substantially parallel rods carried by the frame pieces, the rods on one member being bent so that they will pass between the rods on the other upon the parts being reversed sufficiently to dislodge the material therefrom.

7. A device of the class described having two members hinged to one another and each composed of wires bent up at one end leaving the other end free for material to slide off thereof and side members to retain the material thereon at the sides thereof.

8. A device of the class described comprising two members, one a top member and the other a bottom member, said members having suitable side parts on three sides thereof to retain the material thereon, but one member being free of such parts on one side thereof, whereby material may be caused to easily slide off thereof, parts of one member being adapted to dislodge the material from the other member upon reversal of the members.

9. A device of the class described, comprising two members, each composed of wire strands, one a top member and the other a bottom member, said members having suitable side parts on three sides thereof to retain the material thereon, but one member being free of such parts on one side thereof, whereby material may be caused to easily slide off thereof, a handle for each member and means hinging said members to one another.

In testimony whereof, I have signed my name to this specification.

ARTHUR E. COWAN.

Copies of this patent may be obtained for five cents each, by addressing the "Commissioner of Patents, Washington, D. C."